US005542267A

United States Patent [19]

Lee et al.

[11] Patent Number: 5,542,267

[45] Date of Patent: Aug. 6, 1996

[54] ABSORPTION HEATING AND COOLING DEVICE

[75] Inventors: Seung-Gap Lee, Suwon; Sung-Ho Gil, Gwacheon; Suk-Hyun Eun, Seoul, all of Rep. of Korea

[73] Assignee: Samsung Electronics Co., Ltd., Suwon, Rep. of Korea

[21] Appl. No.: 414,389

[22] Filed: Mar. 31, 1995

Related U.S. Application Data

[62] Division of Ser. No. 144,537, Nov. 2, 1993, Pat. No. 5,421,173.

[30] Foreign Application Priority Data

| | | | |
|---|---|---|---|
| Nov. 3, 1992 | [KR] | Rep. of Korea | 1992-20548 |
| Apr. 16, 1993 | [KR] | Rep. of Korea | 1993-6407 |
| May 14, 1993 | [KR] | Rep. of Korea | 1993-8289 |

[51] Int. Cl.[6] .......... F25B 15/00

[52] U.S. Cl. .......... 62/485; 62/476

[58] Field of Search .......... 62/476, 485, 101, 62/324.2; 165/104.12

[56] References Cited

U.S. PATENT DOCUMENTS

| | | | |
|---|---|---|---|
| 1,878,831 | 9/1932 | Cummings | 62/101 |
| 2,210,496 | 8/1940 | Peltier | 62/101 |
| 3,316,735 | 5/1967 | Edberg | 62/476 |
| 3,828,575 | 8/1974 | Mallosky et al. | 62/476 |
| 3,964,273 | 6/1976 | Merrick | 62/476 |
| 4,437,321 | 3/1984 | Asai | 62/324.2 |
| 4,545,217 | 10/1985 | Nakao et al. | 62/476 |
| 4,719,767 | 1/1988 | Reid et al. | 62/476 |
| 4,926,659 | 5/1990 | Christenson et al. | 62/476 |
| 5,007,251 | 4/1991 | Theuz et al. | 62/476 |
| 5,044,174 | 9/1991 | Nagao | 62/476 |
| 5,174,129 | 12/1992 | Kondo | 62/476 |
| 5,271,246 | 12/1993 | Yamauchi | 62/476 |
| 5,282,369 | 2/1994 | Ohuchi et al. | 62/476 |
| 5,295,371 | 3/1994 | Oonou et al. | 62/476 |

FOREIGN PATENT DOCUMENTS

| | | |
|---|---|---|
| 2-22872 | 5/1990 | Japan . |
| 3-199864 | 8/1991 | Japan . |
| 4-56227 | 9/1992 | Japan . |

*Primary Examiner*—Henry A. Bennett
*Assistant Examiner*—William C. Doerrler
*Attorney, Agent, or Firm*—Burns, Doane, Swecker & Mathis, L.L.P.

[57] ABSTRACT

An absorption heating and cooling apparatus includes a generator for separating a dilute solution into a high temperature gaseous refrigerant and a refrigerant-absorbing liquid. The gaseous refrigerant is conducted to an absorber either directly (heating cycle) or indirectly by way of a condenser (cooling cycle). In a heating cycle, the hot gaseous refrigerant fed to the absorber heats a heat exchange fluid (e.g., for heating a room), whereupon the gaseous refrigerant condenses to a liquid. In the cooling cycle, the gaseous refrigerant is condensed into a cold liquid refrigerant in the condenser and is sent to the absorber wherein it cools the heat exchange liquid. In both the heating and cooling cycles, refrigerant-absorbing liquid conducted from the generator to the absorber is mixed with the liquid refrigerant therein following the heat-exchange step. That mixture is returned to the generator along a path in which it travels in heat exchange relationship with the refrigerant-absorbing liquid being conducted to the absorber.

9 Claims, 12 Drawing Sheets

B
25
3
8
19
4
17
75
28
11
7
24
4
5
10
10
20
9a
9a
9
9
P
16
27
2
2
16
5a
4b
5b
7
5c
18
18
29
29
A
A
22
12
21
13
23
6
11'
1
35
70

28
3
26
11
27
11'

28
3
26
11
27
11'

140
8
25
119a
113b
103b
112b
119a
190
175
190
170
168
190
105
104d
104c
104b
105a
119b
107
162
107
116
128
119b
20
162
104a
125
174d
105b
174c
174b
116
174a
P
24
29
29
131a
181c
22
181d
23
181e
182a
181f
101
21
135
112a
120
113
106

ABSORPTION HEATING AND COOLING DEVICE

This application is a divisional of application Ser. No. 08/144,537, filed Nov. 2, 1993, now U.S. Pat. No. 5,421,173.

BACKGROUND OF THE INVENTION

1. Field of the Invention

The present invention relates in general to a heating and cooling device, and more particularly to an absorption heating and cooling device for heating and cooling the room by heating lithium bromide solution.

2. Description of the Prior Art

There have been proposed several types of absorption heating and cooling devices such as disclosed in Japanese Patent Publication No. Heisei. 4-56227, Japanese Patent Laid-open Publication No. Heisei. 3-199864 and Japanese Patent Publication No. Heisei. 2-22872.

With reference to FIG. 12. there is shown an absorption heating and cooling device disclosed in Japanese Patent Publication No. Heisei 4-56227. This heating and cooling device maintains the inner pressure of its evaporator 201 at about 1/100 atm. In this device, the refrigerant liquid is sprayed by a refrigerant pump 202 to a heat transfer pipe, through which the cool water 203 passes, thus to absorb the heat from the cool water in the heat transfer pipe and to achieve a desired cooling effect. The evaporated refrigerant gas is supplied to an absorption unit 205 which is maintained at a lower pressure by the cooling water 204 and in which the refrigerant gas is absorbed into lithium bromide solution sprayed by a solution pump 206, thus to dilute the lithium bromide solution in order to make lithium bromide dilute solution. Part of the lithium bromide dilute solution is in turn introduced into a high temperature regenerator 208 through a heat exchanger 207 by the solution pump 206 and divided, in the regenerator 208, into directly heated gas and concentrated solution. On the other hand, the remainder of the lithium bromide dilute solution is introduced into a low temperature regenerator 209 and heated in the regenerator 209 by the gas generated by the high temperature regenerator 208 in order to be divided into gas and concentrated solution. The concentrated solution of the regenerators 208 and 209 are in turn introduced into the absorption unit 205 through the heat exchanger 207. A condensed drain resulting from heating of the lithium bromide solution in the low temperature regenerator 209 is introduced into a condenser 210. In addition, the gas generated by the low temperature regenerator 209 is condensed in the condenser 210.

The condensed refrigerant is in turn introduced into the evaporator 201, thus to accomplish one cooling cycle. Here, the condensed refrigerant received by the evaporator 201 is sprayed by a first spray nozzle 211 and the solution of the absorption unit 205 is sprayed by a second spray nozzle 212.

However, in the aforementioned absorption heating and cooling device, the time for heat exchanging between the cool water and the refrigerant circulated in the evaporator is relatively short and the heat transfer area is relatively small, so that it is difficult to improve the heat exchanging efficiency and the refrigerant evaporating efficiency of the device. In addition, it is very difficult to evenly supply the refrigerant to the surface of the evaporator, thus to cause the refrigerant to be only partially evaporated on a part of the heat exchanger.

SUMMARY OF THE INVENTION

It is, therefore, an object of the present invention to provide an absorption heating and cooling device in which the aforementioned problems can be overcome and which is used as a cooler in summer and as a heater in winter.

It is another object of the present invention to provide an absorption heating and cooling device which remarkably improves heating and cooling efficiency and has a simple construction, and is easily installed.

It is a further object of the present invention to provide an absorption heating and cooling device in which high temperature and high pressure refrigerant gas is sprayed and condensed in order to improve the condensation efficiency of the refrigerant, and a concentrated solution is cooled by an outside air and supplied to an absorber under the cooled state, thus to improve the absorption efficiency of the solution for the evaporated gas and to increase the heat transferring area, and to improve the heat exchanging efficiency.

It is yet another object of the present invention to provide an absorption heating and cooling device which evenly supplies the refrigerant to a cool water pipe system or the evaporator in order to improve the evaporation efficiency of the refrigerant, and evenly supplies the concentrated solution to a lower section of an inner surface of the absorber in order to desirably absorb the evaporated refrigerant.

In an aspect, the present invention provides an absorption heating and cooling device comprising a generator generating a high temperature and high pressure refrigerant gas, a condenser supplied with the refrigerant gas from the generator and condensing the refrigerant gas, a gas supply pipe connected between the generator and the condenser for introducing the refrigerant gas from the generator to the condenser and provided at a middle section thereof with a first two-way flow controller for controlling the flowing direction of the refrigerant gas, a first connection pipe connected between the condenser and an absorber in order to introduce the refrigerant condensed by the condenser to the absorber and provided at a middle section thereof with a first three-way flow controller for controlling the flowing direction of the condensed refrigerant, a cool water pipe extending through the absorber for heat exchanging with the condensed refrigerant and connected to both a cool water inlet pipe and a cool water supply pipe at opposed ends thereof, the absorber absorbing the refrigerant evaporated as a result of the heat exchanging with the cool water pipe, and a solution heat exchanger connected between the generator and the absorber for heat exchanging between the refrigerant returning from the absorber to the generator through a recovery pipe and a concentrated solution introduced from the generator to the absorber through a solution introducing pipe.

In another aspect, the present invention provides an absorption heating and cooling device comprising a generator generating a high temperature and high pressure refrigerant gas, a plurality of condensers supplied with the refrigerant gas from the generator and condensing the refrigerant gas, a plurality of first branch pipes connected between the generator and the condensers for introducing the refrigerant gas from the generator to the condensers, a refrigerant tank collecting the condensed refrigerant of the condensers through a plurality of second branch pipes, a refrigerant distributer provided in a first absorber and supplied with the condensed refrigerant from the refrigerant tank through a first connection pipe, a coiled cool water pipe provided in the first absorber for heat exchanging with the condensed refrigerant distributed by the refrigerant distributer, and connected to both a cool water inlet pipe and a cool water supply pipe at opposed ends thereof, the first absorber absorbing the refrigerant evaporated as a result of the heat exchanging with the coiled cool water pipe, a solution distributer provided in the first absorber and supplied with a concentrated solution from the generator through a solution supply pipe and distributing the solution in order to flow this solution along an inner surface of the first absorber while absorbing the evaporated refrigerant, and a second absorber supplied with the concentrated solution from the generator through a solution heat exchanger and a solution supply pipe and cooling this solution.

BRIEF DESCRIPTION OF THE DRAWINGS

The above and other objects, features and other advantages of the present invention will be more clearly understood from the following detailed description taken in conjunction with the accompanying drawings, in which:

FIG. 3A and 3B are enlarged views of a three-way flow controller and a two-way flow controller of the encircled section P of FIG. 1, respectively, in which;

FIG. 3A shows a flow control operation of the three-way flow controller and the two-way flow controller in the case of a cooling operation of the absorption heating and cooling device of FIG. 1; and FIG. 3B shows a flow control operation of the three-way flow controller and the two-way flow controller in the case of a heating operation of the absorption heating and cooling device of FIG. 1;

DESCRIPTION OF THE PREFERRED EMBODIMENTS

Figure 1:
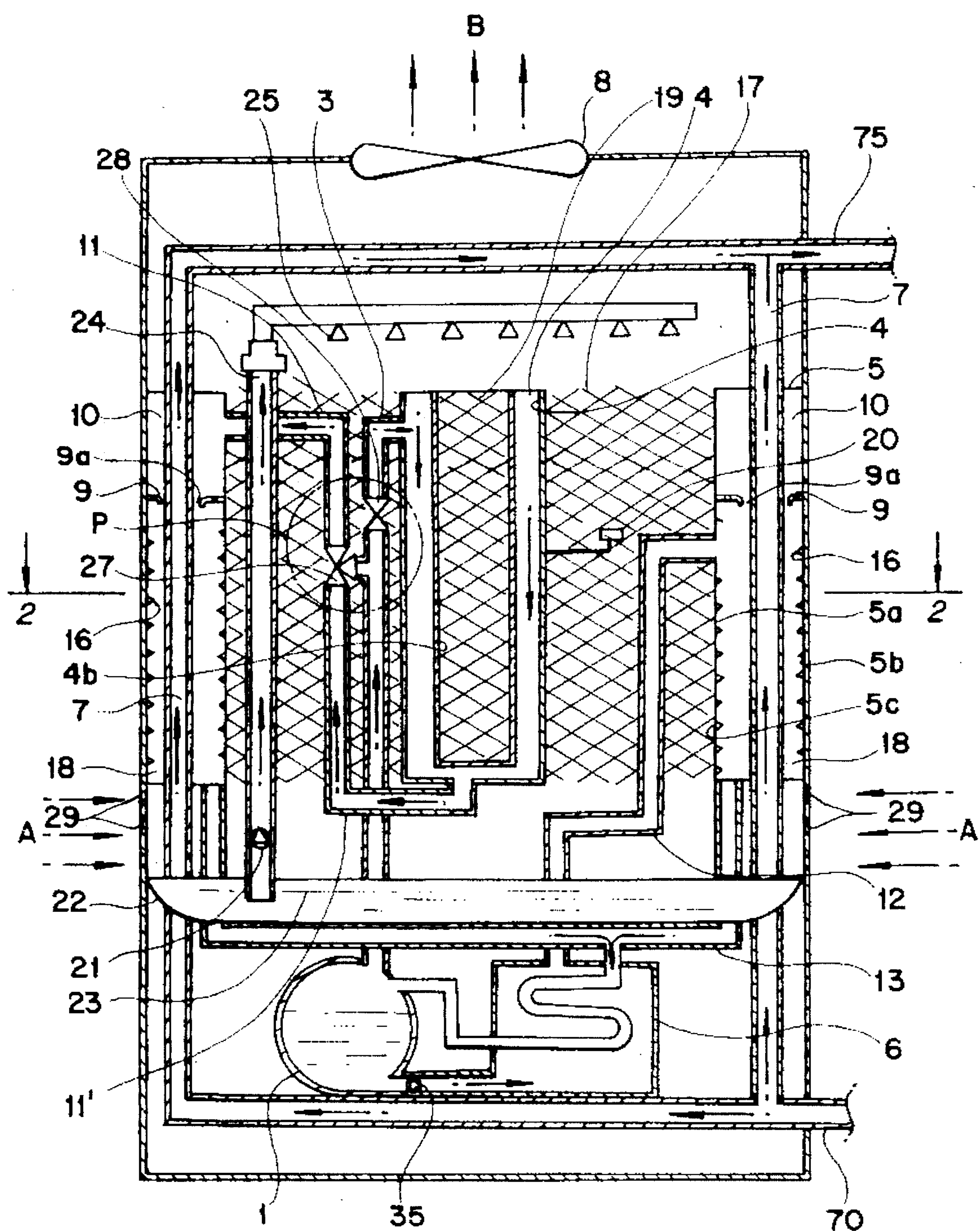
FIG. 1 is a schematic sectional view of an absorption heating and cooling device in accordance with a primary embodiment of the present invention.
Figure 2:
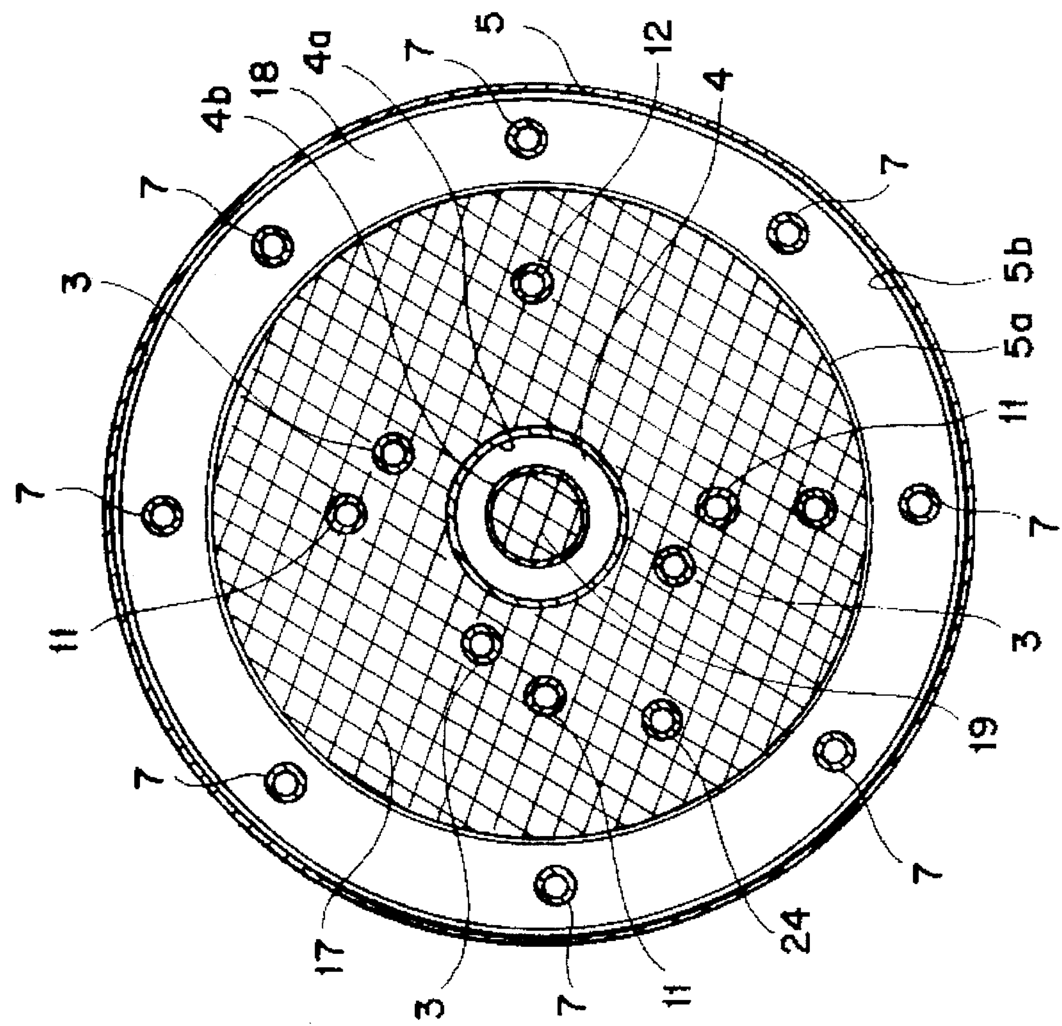
FIG. 2 is a sectional view taken along the section line A—A' of FIG. 1.

With reference to FIGS. 1, 2, 3A and 3B, there is shown an absorption heating and cooling device in accordance with a primary embodiment of the present invention. In this heating and cooling device, a high temperature and high pressure refrigerant gas generated by the generator 1 is supplied to an upper section of a vertical hollow cylinder or a condenser 4 through a gas supply pipe 3 which is provided with a first two-way flow controller 28 at its middle section. An outer vertical cylinder or an absorber 5 concentrically surrounds the condenser 4 and is provided at its middle section with a horizontal partition plate 9. This partition plate 9 is formed with a plurality of through holes 9*a*, through which individual cool water branch pipes 7 described later herein pass, and partitions the absorber 5 into two chambers, that is an upper chamber 10 and a lower chamber 18.

The cool water branch pipes 7, which comprise a plurality of thin pipes branched from a cool water inlet pipe 70 connected to an outlet of a heat exchanger installed in the room, pass through individual through holes 9*a* of the partition plate 9 in order to vertically extend in the heating and cooling device and to be spaced out at regular intervals. Here, the outer surfaces of the cool water branch pipes 7 function as an evaporator of the heating and cooling device of this invention.

The heating and cooling device also includes a first connection pipe 11,11 which is connected between the condenser 4 and the upper chamber 10 of the absorber 5 in order to introduce the refrigerant, condensed at the lower section of the condenser 4, into the upper chamber 10. This first connection pipe 11 is provided with a first three-way flow controller 27 at its middle section and divided into two pipes, that is, an upper connection pipe 11 and a lower connection pipe 11', about the first three-way flow controller 27.

The gas supply pipe 3 for introducing the high temperature and high pressure gas generated by the generator 1 into the upper section of the condenser 4 is connected to the first connection pipe 11 through a tributary pipe 26. (see FIG. 3A.) This tributary pipe 26 changes the flowing direction of the high temperature and high pressure gas in accordance with the operation, that is, the cooling operation and the heating operation of the heating and cooling device. This tributary pipe 26 is connected to the first three-way flow controller 27 at an end thereof and connected to the first two-way flow controller 28 at the other end thereof.

In the absorption heating and cooling device in accordance with the primary embodiment, a concentrated solution introducing pipe 12 is connected between the lower chamber 18 of the absorber 5 and a solution heat exchanger 6 such that it supplies a refrigerant absorbing liquid in the form of lithium bromide) the concentrated solution (e.g.) of the generator 1 to the lower chamber 18 of the absorber 5 through the solution heat exchanger 6 by the pumping force of a solution pump 35.

In the absorption heating and cooling device of the above primary embodiment, the first three-way flow controller 27 as well as the first two-way flow controller 28 controls the flowing direction of the high temperature and high pressure refrigerant gas generated by the generator 1 in accordance with the operation of the heating and cooling device, that is, the cooling operation (cooling mode) and the heating operation (heating mode).

In order to cause heat exchanging between the high temperature and high pressure concentrated solution. introduced into the lower chamber 18 of the absorber 5 from the generator 1 through the pipe 12 by the pumping force of the solution pump 35, and the dilute solution introduced into the generator 1 from the lower chamber 18 of the absorber 5 through a solution recovery pipe or a second connection pipe 13, the solution heat exchanger 6 is provided between the generator 1 and the second connection pipe 13.

On the other hand, a screw type heat transfer fin 16 is fixed to the inner surface of the absorber 5 in order to improve the absorption effect for the refrigerant gas evaporated during the heating or cooling operation of the heating and cooling device. In addition, a heat transfer fin 17 is provided between an outside outer surface 4*a* of the condenser 4 and an inside outer surface 5*c* of the absorber 5. This heat transfer fin 17 functions as a heat exchanger for radiating condensation heat generated by the condenser 4 during the cooling operation of the heating and cooling device as well as absorption heat emitted from the inside outer surface of the absorber 5 during the cooling operation. The condenser 4 further includes an aircooled fin 19, provided on an inside inner surface 4*b* of a hollow section of the condenser 4 in order to function as a heat exchanger during the cooling operation. A temperature sensor 20 is provided on the outside outer surface 4*a* of the condenser 4 in order to sense temperatures of both the refrigerant in the condenser 4 and the solution in the absorber 5.

The heating and cooling device of this invention also includes a cooling water supply pipe 24 which is in turn provided with a cooling water pump 21. When the temperature sensor 20 senses the temperatures of both the refrigerant in the condenser 4 and the solution in the absorber 5 and determines that the sensed temperatures are higher than predetermined temperature levels, it outputs a temperature signal representing the sensed temperatures to a conventional controller (not shown). Upon reception of the temperature signal, this controller controls the cooling water pump 21 of the cooling water supply pipe 24 in order to pump the cooling water 23 from a cooling water dish 22 and to supply this cooling water 23 to a cooling water spray 25, thus to cause the cooling water to be sprayed by this spray 25 in order to cool elements of cooling unit of the device such as the heat transfer fin 17 and the aircooled fin 19.

In the heating and cooling device, a fan 8 is provided above the cooling water spray 25 in order to suck the external air into the device through an air intake port 29 provided below the lower chamber 18 of the absorber 5 and along an air flowing direction as shown at the arrow A of FIG. 1, thus to aircool the heat transfer fin 17 and the aircooled fin 19.

Figure 3B:
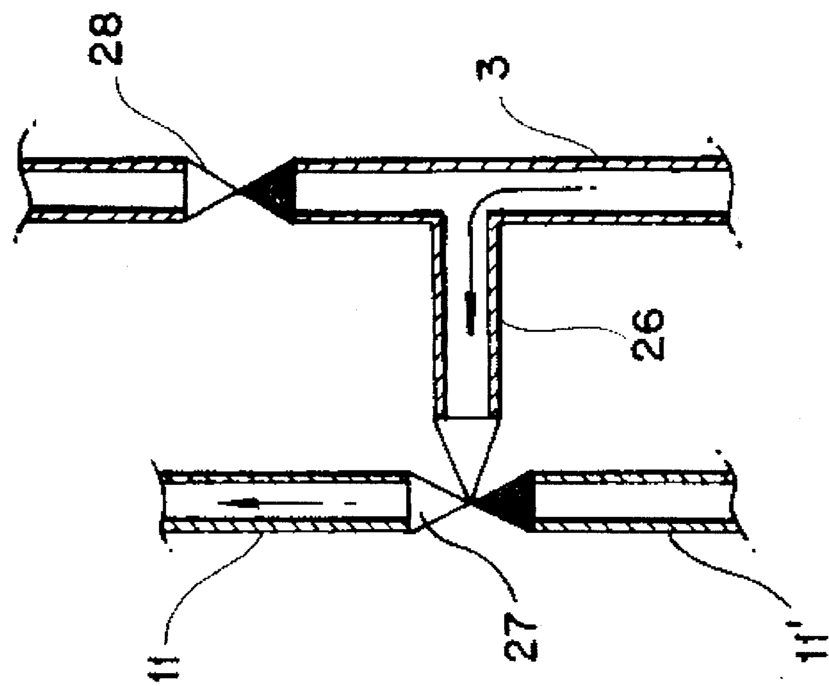
Figure 3A:
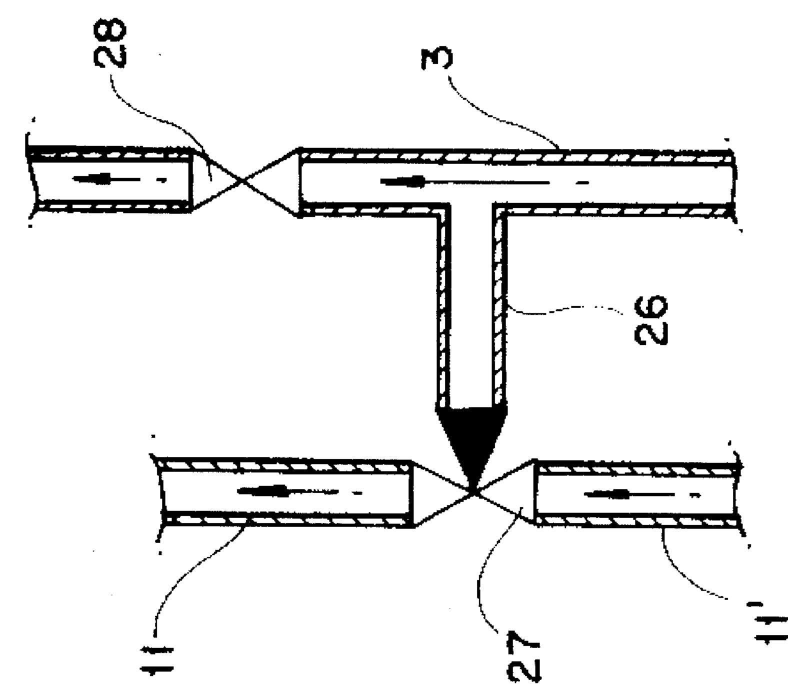

In FIGS. 3A and 3B, the marks ▲ denote closed portions of both the three-way flow controller 27 and the two-way flow controller 28, while the marks Δ denote open portions of the flow controllers 27 and 28.

Hereinbelow, the operational effect of the absorption heating and cooling device according to the primary embodiment of the present invention will be described.

In the cooling operation of the device, the high temperature and high pressure refrigerant gas generated by the generator 1 is directly introduced into the condenser 4 through the gas supply pipe 3 and the first two-way flow controller 28, both being placed about the heat transfer fin 17 provided between the condenser 4 and the absorber 5.

At this time, the flow passage of the refrigerant gas from the generator 1 to the tributary pipe 26 is closed by the first three-way flow controller 27 and, at the same time, the flow passage from the lower section of the condenser 4 to the upper chamber 10 of the absorber 5 is opened as shown in FIG. 3A. The refrigerant gas introduced into the condenser 4 is, therefore, condensed in the condenser 4 while generating the condensation heat at both the outside outer surface 4*a* and the inside inner surface 4*b* of the condenser 4. A refrigerant fluid in the form of that condensed refrigerant is in turn introduced into the upper chamber 10 of the absorber 5 through the lower and upper connection pipes of the first connection pipe 11, connected between the lower section of the condenser 4 and the upper section of the upper chamber 10 of the absorber 5, and the first three-way flow controller 27.

The condensed refrigerant introduced into the upper chamber 10 of the absorber 5, in turn flows through the plurality of through holes 9*a* of the partition plate 9 and contacts with the outer surface of the cool water pipe 7 in order to be evaporated and to cool the cool water flowing in the pipe 7. At this time, the concentrated solution is outputted from the generator 1 by the pumping force of the solution pump 35 and introduced into the upper section of the lower chamber 18 of the absorber 5 through the solution heat exchanger 6 and the solution introducing pipe 12. In the lower chamber 18 of the absorber 5, the concentrated solution absorbs the evaporated refrigerant, flowing along the inside outer surface 5*a* of the lower chamber 18 of the absorber 5 which is provided with the screw-type heat transfer fin 16, while generating absorption heat, thus to become a dilute solution.

This dilute solution is in turn discharged from the lower chamber 18 of the absorber 5 through the solution recovery pipe, that is, the second connection pipe 13 connected between the lower chamber 18 and the generator 1, and recovered by the generator 1. Thus, one cooling cycle of the device is finished. During the recovery of the dilute solution, this dilute solution exchanges, at the solution heat exchanger 6, the heat with the concentrated solution flowing from the generator 1 to the lower chamber 18 of the absorber 5.

On the other hand, the cool water which flows in the cool water pipe 7 and is cooled by the evaporation of the refrigerant gas in the lower chamber 18 of the absorber 5 is supplied to a room heat exchanger (not shown) through a cool water supply pipe 75, thus to exchange the heat with the room air and to cool the room.

In order to remove the condensation heat of the condenser 4 as well as the absorption heat generated from the outside inner surface of the lower chamber 18 of the absorber 5 during the cooling operation of the device, the fan 8 provided above the cooling water spray 25 sucks the external air into the device through the air intake port 29 as shown at the arrow A of FIG. 1. The air circulates about the heat transfer fin 17, provided between the outside outer surface 4*a* of the condenser 4 and the inside outer surface 5*c* of the absorber 5, and about the aircooled fin 19, provided on the inside inner surface 4*b* of the hollow section of the condenser 4, and between the fins 17 and 19 or between the inside outer surface 5*c* of the absorber 5 and the outside outer surface 4*a* of the condenser 4, and is exhausted from the device as shown at the arrow B of FIG. 1.

When the cooling effect of the fins 17 and 19 is not sufficient, the temperatures and pressures of both the refrigerant in the condenser 4 and the solution in the absorber 5 are increased and this may cause an unstable operation of the heating and cooling device as well as precipitation of refrigerant crystals during the cooling operation cycle of the device. In this case, the temperature sensor 20 on the outside outer surface 4*a* of the condenser 4 senses temperatures of both the refrigerant and the solution and outputs a temperature signal representing the sensed temperatures to the conventional controller. Upon reception of the temperature signal, this controller compares the temperatures indicated by the signal with the predetermined temperature levels. As a result of the comparison of the temperatures, the controller determines that the temperatures of both the refrigerant and the solution are higher than the predetermined levels. The controller thus controls the cooling water pump 21 of the cooling water supply pipe 24 in order to pump the cooling water 23 in the cooling water dish 22 and to supply this cooling water 23 to the cooling water spray 25. This cooling water is sprayed by the spray 25 to about the heat transfer fin 17 and about the aircooled fin 19 in order to remove the condensation heat as well as the absorption heat.

Meanwhile, in the heating operation of the device, the fan 8 is not rotated and the cooling water spray 25 sprays no water. In this heating operation, a refrigerant fluid in the form of the high temperature and high pressure refrigerant gas generated by the generator 1 is not introduced into the condenser 4 but directly introduced into the upper chamber 10 of the absorber 5. In order to directly introduce the refrigerant gas to the upper chamber 10, the first two-way flow controller 28 is closed and, at the same time, the lower flow passage of the first three-way flow controller 27 or the lower connection pipe of the first connection pipe 11 is closed, while the upper connection pipe of the first connection pipe 11 and the tributary pipe 26 are opened as shown in FIG. 3B.

The refrigerant gas, introduced into the absorber 5, flows from the upper chamber 10 to the lower chamber 18 of the absorber 5 and is condensed while generating the condensation heat, thus to heat the cool water flowing in the cool water pipe 7. At the same time, the concentrated solution is outputted from the generator 1 by the pumping force of the solution pump 35 in order to be introduced into the upper section of the lower chamber 18 of the absorber 5 through the solution heat exchanger 6 and the concentrated solution introducing pipe 12. In the lower chamber 18 of the absorber 5, the concentrated solution flows down along the inner surface of the absorber 5 and heats the cool water flowing the cool water pipe 7. This heated water is in turn supplied to the room heat exchanger through the cool water pipe 7 and the cool water supply pipe 75, thus to exchange the heat with the room air and to heat the room.

As described above, in the cooling operation of the absorption heating and cooling device according to the primary embodiment of the present invention, the refrigerant gas introduced into the condenser 4 and in turn into the upper chamber 10 of the absorber 5 flows down from the upper chamber 10 to the lower chamber 18 through the through holes 9*a* of the partition plate 9 and flows along the outer surface of the cool water pipe 7, thus to be evaporated and cool the cool water flowing the cool water pipe 7. The evaporated refrigerant is in turn absorbed into the concentrated solution introduced from the generator 1 into the upper section of the lower chamber 18 of the absorber 5.

The water cooled by the evaporation of the refrigerant is supplied to the room heat exchanger through the cool water pipe 7 and cools the room. Thus, this heating and cooling device is used as a cooler in summer.

On the other hand, in the heating operation of the absorption heating and cooling device according to the primary embodiment, the air suction fan and the cool water spray are not operated, and the refrigerant gas is introduced into the upper chamber 10 of the absorber 5 and, at the same time, the concentrated solution is introduced into the lower chamber 18 of the absorber 5. The refrigerant flows down from the upper chamber 10 to the lower chamber 18 through the through holes 9*a* of the partition plate 9 and along the outer surface of the cool water pipe 7, thus to heat the cool water flowing in the cool water pipe 7. The water heated by the refrigerant is supplied to the room heat exchanger through the cool water pipe 7 and heats the room. Thus, this heating and cooling device is used as a heater in spring, autumn and winter.

Figure 4:
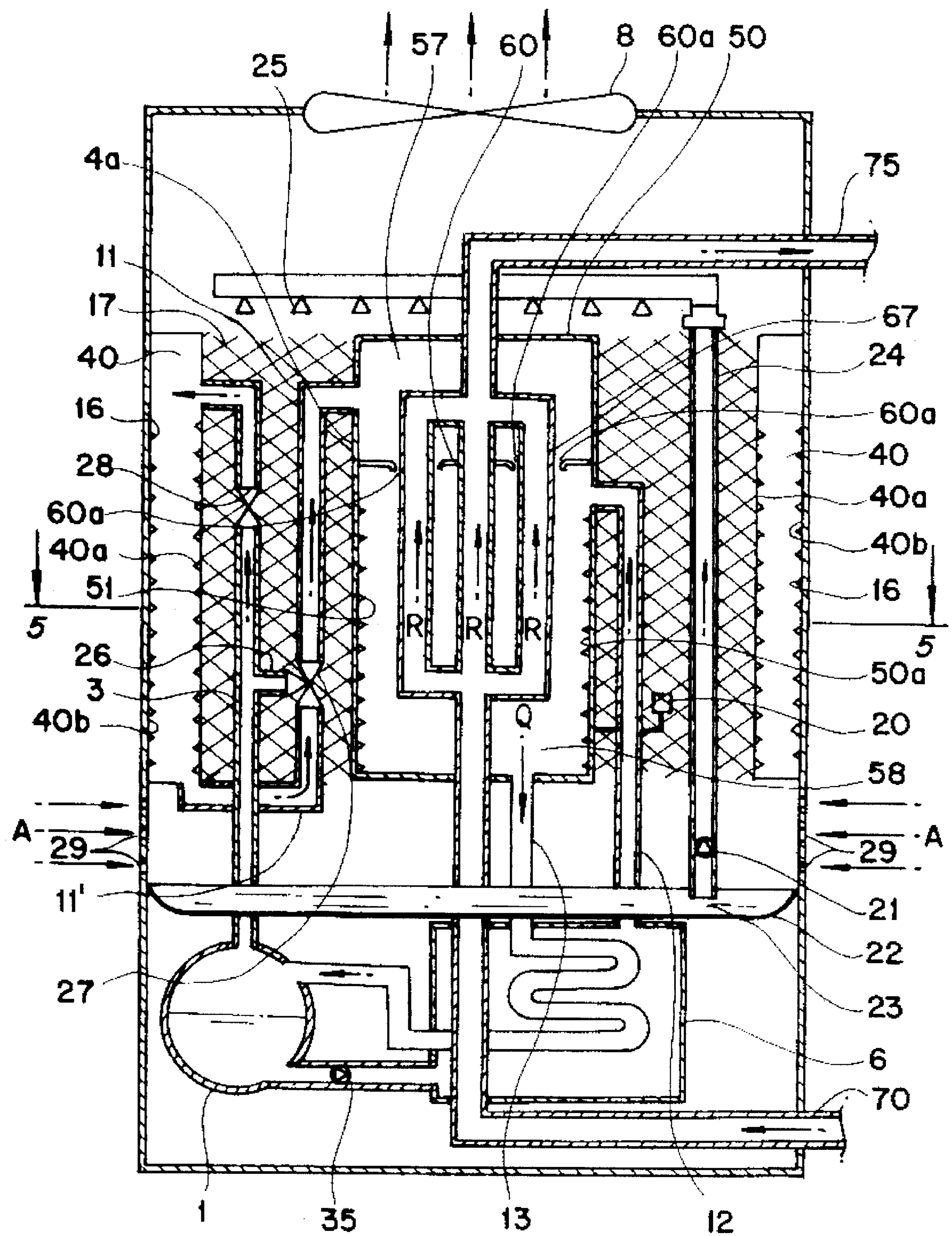
FIG. 4 is a schematic sectional view of an absorption heating and cooling device in accordance with a second alternate embodiment of the present invention.
Figure 5:
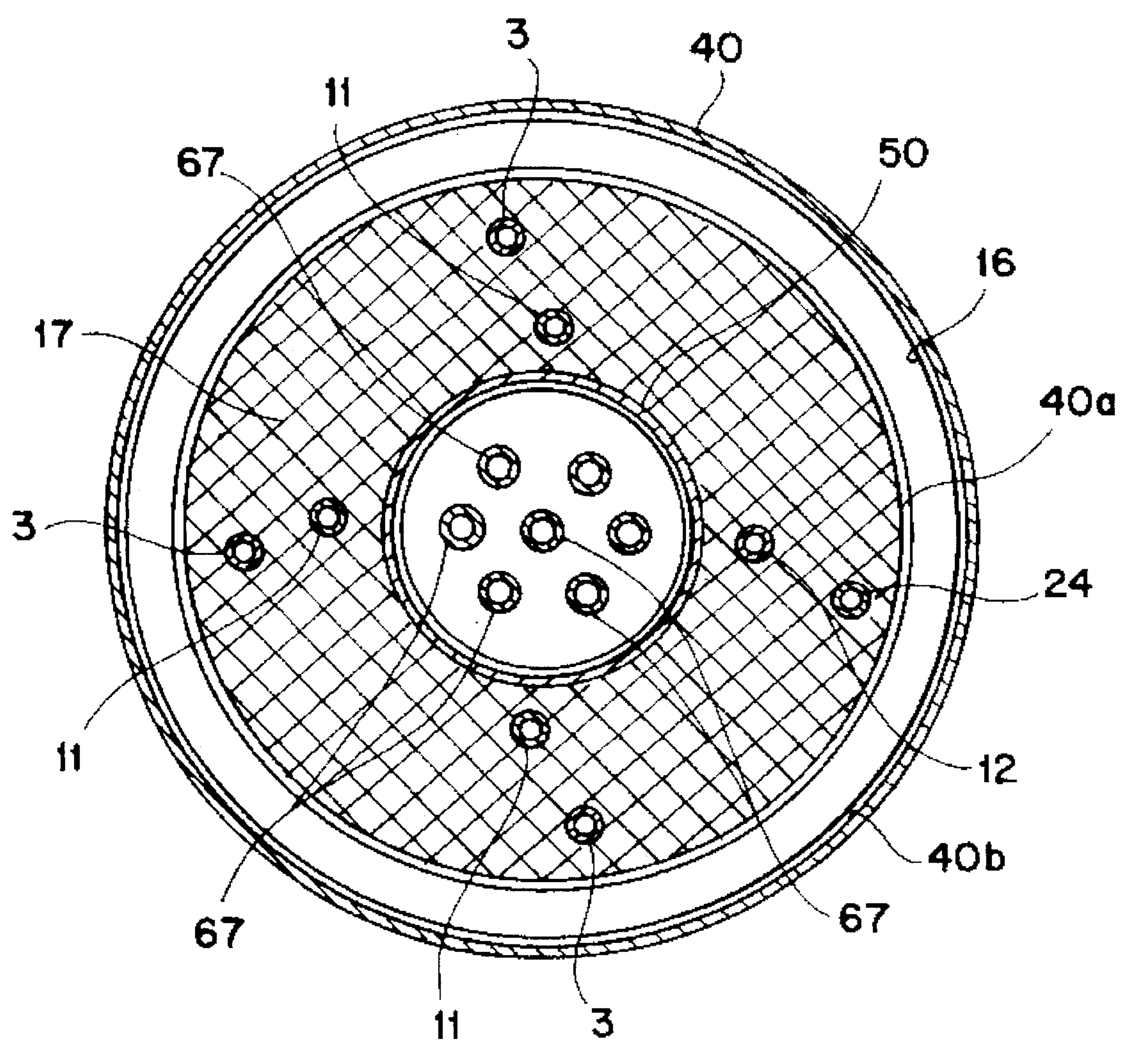
FIG. 5 is a sectional view taken along the section line B—B' of FIG. 4.

FIG. 4 is a sectional view of an absorption heating and cooling device in accordance with a second alternate embodiment of the present invention, and FIG. 5 is a sectional view taken along the section line B–B' of FIG. 4. In the following description for the second alternate embodiment, the same elements as those of the primary embodiment will carry the same reference numerals and further explanation for those elements is not given.

Most of the elements of the second alternate embodiment are common with those of the aforementioned primary embodiment except for the following elements.

That is, a cool water pipe 67 concentrically penetrates an absorber 50 which is in turn provided in a condenser 40. The absorber 50 is divided into two chambers, that is, an upper chamber 57 and a lower chamber 58, by a partition plate 60. On the other hand, a screw type heat transfer fin 51 is fixed to an inside inner surface 50*a* of the lower chamber 58 of the absorber 5. The partition plate 60 is formed with a plurality of through holes 60*a*, through which individual cool water branch pipes 67 pass. The cool water branch pipes 67, which comprise a plurality of thin pipes branched from a cool water inlet pipe 70 connected to an outlet of a heat exchanger installed in the room, pass through individual through holes 60*a* of the partition plate 60 in order to vertically extend in the heating and cooling device and to be spaced out at regular intervals. Here, the outer surfaces of the cool water branch pipes 67 function as an evaporator where the refrigerant is evaporated.

In a cooling operation of the device of the second alternate embodiment, the high temperature and high pressure refrigerant gas generated by the generator 1 is introduced into an upper section of the condenser 40 through the gas supply pipe 3 and the first two-way flow controller 28, both being placed between the condenser 40 and the absorber 50. At this time, the refrigerant gas in the condenser 40 is condensed at an inner surface 40*a* and an outside inner surface 40*b* of the condenser 40. In this case, since the flow passage of the refrigerant gas from the generator 1 to the tributary pipe 26 is closed by the first three-way flow controller 27, the condensed refrigerant is introduced into the upper chamber 57 of the absorber 50 through the lower and upper connection pipes of the first connection pipe 11 and the first three-way flow controller 27.

The condensed refrigerant introduced into the upper chamber 57 of the absorber 50, is in turn dropped through the plurality of through holes 60*a* of the partition plate 60 and contacts with the outer surface of the cool water pipe 67 in order to be evaporated and to exchange the heat with the cool water which is introduced through the cool water main pipe 70 and flows in the cool water pipe 67 in a direction as shown at the arrow R of FIG. 4. Thus, heat exchange fluid in the form of cool water is cooled by the refrigerant and in turn supplied to the room heat exchanger (not shown) through the cool water supply pipe 75, thus to exchange the heat with the room air and to cool the room.

On the other hand, the dilute solution collected on the lower chamber 58 of the absorber 50 is in turn discharged from the lower chamber 58 of the absorber 50 through the solution recovery pipe, that is, the second connection pipe 13 connected between the lower chamber 58 and the generator 1, and recovered by the generator 1. Thus, one cooling cycle of the device is finished. During the recovery of the dilute solution, this dilute solution exchanges, at the solution heat exchanger 6, the heat with the concentrated solution.

Meanwhile, in a heating operation of the device of the second alternate embodiment, the fan 8 is not rotated and the cooling water spray 25 sprays no water. In this heating operation, the high temperature and high pressure refrigerant gas of the generator 1 is not introduced into the condenser 40 but directly introduced into the upper chamber 57 of the absorber 50. In order to directly introduce the refrigerant gas to the upper chamber 57, the first two-way flow controller 28 is closed and, at the same time, the lower flow passage of the first three-way flow controller 27 or the lower connection pipe of the first connection pipe 11 is closed, while the upper connection pipe of the first connection pipe 11 and the tributary pipe 26 are opened.

The refrigerant gas, introduced into the absorber 50, flows from the upper chamber 57 to the lower chamber 58 of the absorber 50 and is condensed while generating the condensation heat. At the same time, the concentrated solution is outputted from the generator 1 by the pumping force of the solution pump 35 in order to be introduced into the upper section of the lower chamber 58 of the absorber 50 through the solution heat exchanger 6 and the concentrated solution introducing pipe 12. At this time, the cool water introduced into the device through the cool water main pipe 70 and flowing in the cool water pipe 67 in the direction of the arrow R is heated by the condensation heat generated when the refrigerant gas flows from the upper chamber 57 to the lower chamber 58 through the plurality of through holes 60*a* of the partition plate 60 in order to be condensed. In addition, the cool water is further heated by the concentrated solution introduced into the upper section of the lower chamber 58 of the absorber 50. The heated water is in turn supplied to the room heat exchanger through the cool water supply pipe 75, thus to exchange the heat with the room air and to heat the room.

As described above, in the cooling operation of the absorption heating and cooling device according to the second alternate embodiment, the refrigerant gas introduced into the condenser 40 and in turn into the upper chamber 57 of the absorber 50 flows down from the upper chamber 57 to the lower chamber 58 through the through holes 60*a* of the partition plate 60 and along the outer surface of the cool water pipe 7, thus to be evaporated and cool the cool water flowing in the cool water pipe 7. The water cooled by the evaporation of the refrigerant is supplied to the room heat exchanger and cools the room.

On the other hand, in the heating operation of the absorption heating and cooling device, the refrigerant gas is introduced into the upper chamber 57 of the absorber 50 and, at the same time, the concentrated solution travels into the lower chamber 58 of the absorber 50. The refrigerant gas and the concentrated solution flowing in the absorber 50 heat the cool water flowing in the cool water pipe 7. The water heated by both the refrigerant gas and the solution is supplied to the room heat exchanger through the cool water pipe 7 and heats the room.

Figure 6:
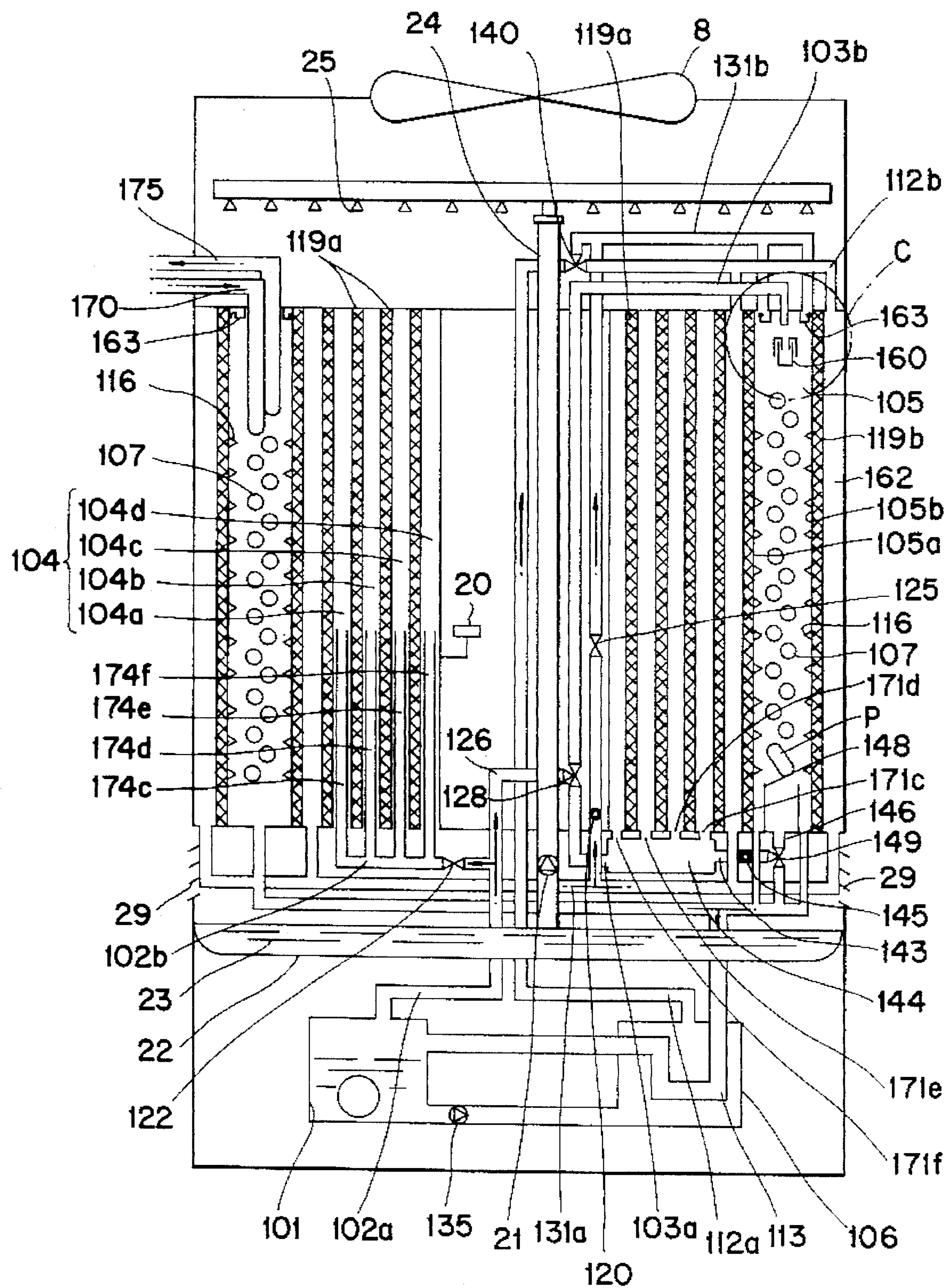
FIG. 6 is a schematic sectional view of an absorption heating and cooling device in accordance with a third alternate embodiment of the present invention.
Figure 7:
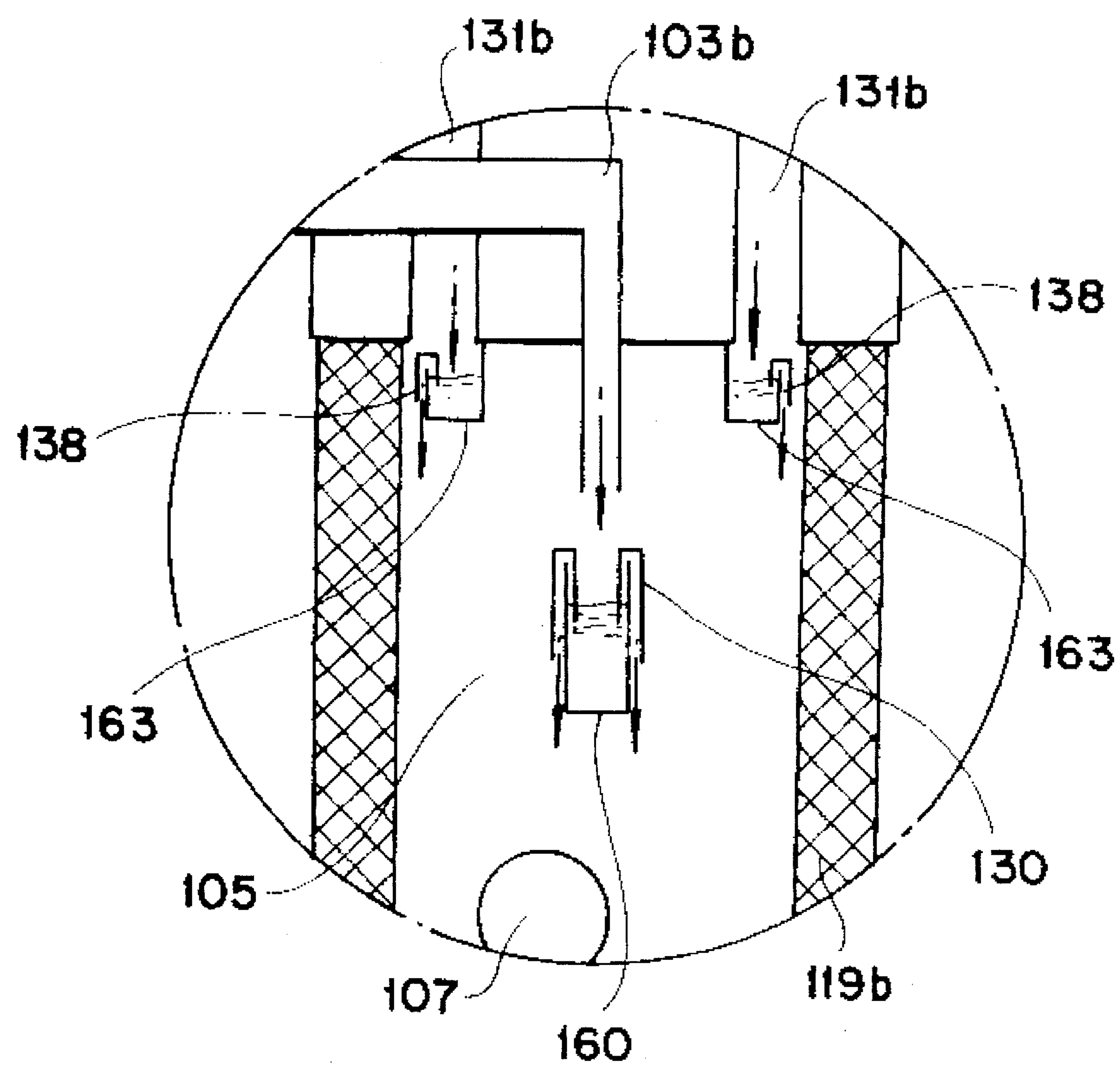
FIG. 7 is an enlarged view of the encircled section C of FIG. 6.

Referring next to FIGS. 6 and 7, FIG. 6 is a schematic sectional view of an absorption heating and cooling device in accordance with a third alternate embodiment of the present invention and FIG. 7 is an enlarged view of the encircled section C of FIG. 6. In the following description for the third alternate embodiment, the same elements as those of the primary and second alternate embodiment will carry the same reference numerals and further explanation for those elements is not given.

In the device of this third embodiment, the high temperature and high pressure refrigerant gas is introduced from a generator 101 into lower sections of a plurality of condensers 104*a* to 104*d* which are vertically arranged in the device. In order to achieve the above introduction of the refrigerant gas into the condensers, an upstream-side gas pipe 102*a* and a downstream-side gas pipe 102*b* are sequentially connected between the generator 101 and the first to fourth condensers 104*a* to 104*d*. The downstream-side gas pipe 102*b* is provided at its middle section with a first two-way flow controller 122 using a two-way solenoid valve.

The first to fourth condenser 104*a* to 104*d* are connected to each other at their lower ends in order to be commonly supplied with the high temperature and high pressure refrigerant gas from the generator 101. Before the refrigerant gas reaches the first to fourth condensers 104*a* to 104*d*, it passes through the upstream-side gas pipe 102*a*, the first two-way flow controller 122, the downstream-side gas pipe 102*b* and a plurality of branch pipes 174*c* to 174*f* branched from the upstream-side gas pipe 102*a*.

Here, in order to evenly introduce the gas to the first to fourth condensers 104*a* to 104*d*, the diameters of the branch pipes 174*c* to 174*f* are different from each other and gradually smaller from the outside pipe to the inside pipe. That is, the outermost branch pipe 174*c* or the first branch pipe has the largest diameter while the innermost branch pipe 174*f* or the fourth pipe has the smallest diameter.

The high temperature and high pressure refrigerant gas introduced into each of the first to fourth condensers 104*a* to 104*d* flows along the inner surface of a corresponding condenser and is condensed while generating the condensation heat. The condensed refrigerant is in turn collected by the a refrigerant tank 144 through the branch pipes 171*c* to 171*f*.

At this time, the condensation heat is radiated to the outside by a plurality of aircooled fin 119*a* which are provided between the first to fourth condensers 104*a* to 104*d*. In order to supply the condensed refrigerant from the first to fourth condensers 104*a* to 104*d* to a refrigerant distributer 160 provided on a first absorber 105, the first to fourth condensers 104*a* to 104*d* are connected to individual branch pipes 171*c* to 171*f* which are in turn connected to the first absorber 105 through the refrigerant tank 144, a first upstream-side connection pipe 103*a*, the first three-way flow controller 128 and a first downstream-side connection pipe 103*b*.

Here, the diameters of the branch pipes 171*c* to 171*f* are different from each other and gradually smaller from the outside pipe to the inside pipe. That is, the outermost branch pipe 171*c* has the largest diameter while the innermost branch pipe 171*f* has the smallest diameter.

The first absorber 105 which is vertically concentrically arranged about the first to fourth condensers 104*a* to 104*d* is provided with a screw type heat transfer fin 116 which is welded to both the inner wall of and the outer wall of the first absorber 105 for improving the absorption effect for the refrigerant gas evaporated during the heating or cooling operation of the heating and cooling device. In addition, under the distal end of the first downstream-side connection pipe 103*b* connected to the upper section of the first absorber 105, the refrigerant distributer 160 having a syphon structure is arranged in the upper inside of the first absorber 105 and horizontally supported by a fixing member (not shown). A second absorber 162 or a precooler is concentrically arranged about the first absorber 105 and supplied with the concentrated solution from a solution heat exchanger 106 through both an upstream-side solution pipe 112*a* and a downstream-side solution pipe 112*b*, and previously cools the concentrated solution. An aircooled fin 119*b* is provided between the first and second absorbers 105 and 162 for heat radiation of the absorption heat generated by the absorbers 105 and 162.

In the first absorber 105, a cool water pipe 107 connected to a cool water introducing pipe 170 spirally extends from the upper section of the absorber 105 to about the bottom of the absorber 105 and in turn spirally extends from the point P about the bottom of the absorber 105 to the upper section of the absorber 105, thus to show a parallel and coiled structure. An end of this cool water pipe 107 is connected to a cool water supply pipe 175 which is in turn connected to a room heat exchanger (not shown).

The high temperature and high pressure concentrated solution of the generator 101 is supplied to the solution heat exchanger 106 by the pumping force of the solution pump 135. This concentrated solution is in turn supplied from the solution heat exchanger 106 to the second absorber 162 through the upstream-side solution pipe 112*a*, a second three-way flow controller 140 and the downstream-side solution pipe 112*b* while exchanging the heat with the dilute solution returning from the first absorber 105 to the generator 101 through the second connection pipe 113. The concentrated solution in the second absorber 162 flows down along the inner surface of the absorber 162 in order to be cooled and collected by the bottom of the absorber 162. The cooled solution on the bottom of the second absorber 162 is in turn supplied to the solution distributer 163 of the upper section of the first absorber 105 by the pumping force of a solution pump 120. In order to achieve the above object, the lower section of the second absorber 162 and the upper section of the first absorber 105 are connected to each other through a third upstream-side connection pipe 131*a*, the solution pump 120, a second two-way flow controller 125 using a two-way solenoid valve, and a third downstream-side connection pipe 131*b*.

In the above heating and cooling device according to the third alternate embodiment, the condensed refrigerant supplied to the refrigerant distributer 160 arranged in the upper section of the first absorber 105 comes into contact with the outer surface of the coiled cool water pipe 107 in the first absorber 105 in order to be evaporated. This evaporated refrigerant is absorbed into the concentrated solution, which is distributed by the solution distributers 163 arranged at positions neighboring the inside inner surface and the outside inner surface of the upper section of the first absorber 105 and flows down along the inner surface of the first absorber 105. The concentrated solution becomes a dilute solution as a result of the absorption of the evaporated refrigerant, and are separated into the condensed refrigerant and the solution by a refrigerant and solution separating member 148, arranged at the lower section of the first absorber 105, prior to returning to the generator 101. The second connection pipe 113 is connected between the solution heat exchanger 106 and the first absorber 105.

In the cooling operation of the device, there may be the refrigerant remaining the condensed state even after it contacts with the outer surface of the cool water pipe 107. This refrigerant remaining in the condensed state is separated from the dilute solution by the separating member 148 and in turn recovered by the refrigerant tank 144 in order to come into contact with the outer surface of the cool water pipe 107 and to be evaporated. In order to achieve the recovery of the refrigerant by the refrigerant tank 144, a recovery pipe 146 and a tributary pipe 143 are connected between the first absorber 105 and the refrigerant tank 144.

A third three-way flow controller 149 using a three-way solenoid valve is provided between the recovery pipe 146, the tributary pipe 143 and the second connection pipe 113 in order to control the flow direction of the condensed refrigerant. The tributary pipe 143 is provided with a refrigerant pump 145 between the third three-way flow controller 149 and the refrigerant tank 144.

In a heating operation of the heating and cooling device of the third embodiment, the high temperature and high pressure refrigerant gas generated by the generator 101 is introduced into the refrigerant distributer 150 provided in the upper section of the first absorber 105 through upstream-side gas pipe 102*a*, the tributary pipe 126, the first three-way flow controller 128 and the first downstream-side connection pipe 103*b*.

Otherwise stated, between the upstream-side gas pipe 102*a*, supplying the high temperature and high pressure refrigerant gas of the generator 101 to the refrigerant distributer 160, and the first connection pipes 103*a* and 103*b*, the tributary pipe 126 is connected at an end thereof to the first three-way flow controller 128 and at the other end thereof to the first two-way flow controller 122 or the downstream-side gas pipe 102*b*. Hence, this tributary pipe 126 can change the flow direction of the refrigerant gas delivered from the generator 101 in accordance with an operation of the device, that is, the heating operation or the cooling operation. Here, the first to third three-way flow controller 128, 140 and 149 and the first and second two-way flow controller 122 and 125 control the flow direction of the refrigerant gas delivered from the generator 101 in accordance with the operation of the device.

At the solution heat exchanger 106, the high temperature and high pressure concentrated solution introduced thereto from the generator 101 by the pumping force of the solution pump 135 exchanges the heat with the dilute solution introduced thereto from the lower section of the first absorber 105 through the second connection pipe 113.

Hereinbelow, detailed description for the solution distributer 163 will be given in conjunction with FIG. 7.

The solution distributer 163 is fixed at a side thereof to a terminal end of the third downstream-side connection pipe 131*b* but spaced at the side thereof apart from the inner surface of the first absorber 105 at a minute gap. This solution distributer 163 also includes a reversed U-shaped second syphon 138 through which the concentrated solution supplied to the distributer 163 is distributed. The distributed solution flows along the inner surface of the first absorber 105 which is provided with the screw type heat transfer fin 116 for improving the absorption effect for the refrigerant gas evaporated during the heating or cooling operation of the device. At this time, the refrigerant is supplied to the refrigerant distributer 160 through the first connection pipe 103*b* and distributed by the first syphon 130 to the outer surface of the cool water pipe 107 in order to be evaporated. This evaporated refrigerant is absorbed into the concentrated solution, so that this concentrated solution becomes a dilute solution.

The plurality of aircooled fins 119*a* are provided between the first to fourth condensers 104*a* to 104*d* in order to radiate the condensation heat generated by the first to fourth condensers 104*a* to 104*d* to the outside. In addition, the aircooled fin 119*b* is provided between the first and second absorbers 105 and 162 for heat radiation of the absorption heat generated by the first and second absorbers 105 and 162.

In a cooling operation of the device of this third embodiment, the first and second two-way flow controllers 122 and 125 are opened, the first three-way flow controller 128 are closed at the tributary pipe 126, the second three-way flow controller 140 is closed at the third connection pipe 131*b* and the third three-way flow controller 149 are opened at the tributary pipe 143.

In a heating operation of the device of this third embodiment, the first and second two-way flow controllers 122 and 125 are closed, the first three-way flow-controller 128 are opened at the first downstream-side connection pipe 103*b* but closed at the first upstream-side connection pipe 103*a*, the second three-way flow controller 140 is closed at the solution pipe 112*b* but opened at the third connection pipe 131*b*, and the third three-way flow controller 149 are closed at the tributary pipe 143. The closing and opening operation of each of the above three-way and two-way flow controllers is controlled by an operation control switch (not shown).

Here, each of the first and second syphons 130 and 138 has a vertical corrugated surface. Due to the vertical corrugated surface of the first syphon 130, the refrigerant evenly drops from the refrigerant distributer 160 onto the outer surface of the coiled cool water pipe 107 spirally extending between the upper section of the first absorber 105 and the bottom of the absorber 105. Due to the vertical corrugated surface of the second syphon 138, the concentrated solution of the solution distributer 163 evenly flows along the inner surface of the first absorber 105.

Each of the first and second syphons 130 and 138 is mounted at a prominence of its corrugated surface, on a side wall of a corresponding distributer 160 or 163. In addition, there is provided a syphon gap between a depression of the corrugated surface of each of the syphons 130 and 138 and the side wall of the corresponding distributer 130 or 138 and this syphon gap causes a desired even distribution of the refrigerant or of the concentrated solution. In this regard, it is not required to precisely horizontally arrange the refrigerant distributer 160 and the solution distributer 163, thus to improve the workability of installation of the distributers 130 and 138.

Hereinbelow, the operational effect of the absorption heating and cooling device according to the third alternate embodiment of the present invention will be described.

In the cooling operation of the device, the high temperature and high pressure refrigerant gas generated by the generator 101 is introduced into the first to fourth condensers 104*a* to 104*d* through the upstream-side gas pipe 102*a*, the first two-way flow controller 122, the downstream-side gas pipe 102*b* and the first to fourth branch pipes 174*c* to 174*f* in order. In this case, the first three-way flow controller 128 is closed at the side of tributary pipe 126. The high temperature and high pressure refrigerant gas introduced into the first to fourth condensers 104*a* to 104*d* is condensed on the inner surfaces of the condensers 104*a* to 104*d* while generating condensation heat. This condensation heat is radiated to the outside by the plurality of aircooled fins 119*a* which are provided between the first to fourth condensers 104*a* to 104*d*, respectively. The condensed refrigerant of the first to fourth condensers 104*a* to 104*d* is collected on the bottoms of the condensers 104*a* to 104*d* and in turn discharged to the refrigerant tank 144 through the branch pipes 171*c* to 171*f*. The condensed refrigerant of the refrigerant tank 144 is, thereafter, supplied to the refrigerant distributer 160 in the upper section of the first absorber 105 through the upstream-side connection pipe 103*a*, the first three-way flow controller 128 and the first downstream-side connection pipe 103*b*. The condensed refrigerant of the distributer 160 is in turn distributed from this distributer 160 through the syphon gap, defined between the depression of the corrugated surface of the first syphon 130 and the side wall of the distributer 130, in accordance with the syphon effect. Thus, the condensed refrigerant evenly drops onto the outer surface of the coiled cool water pipe 107, spirally extending between the upper section of the first absorber 105 and the bottom of the absorber 105, and is evaporated and cools the cool water flowing in the cool water pipe 107.

On the other hand, the concentrated solution is supplied from the generator 101 to the upper section of the second absorber 162 used as the preheater through the solution pump 135, the solution heat exchanger 106, the upstream-side solution pipe 112*a*, the second three-way flow controller 140 and the downstream-side solution pipe 112*b*. This solution flows down along the inner surface of the second absorber 162 while being cooled by the air circulating on the outer surface of the absorber 162. The cooled solution is collected on the bottom of the second absorber 162.

The cooled solution on the bottom of the second absorber 162 is in turn pumped by the solution pump 120 in order to be supplied to the solution distributer 163 in the upper section of the first absorber 105 through the third upstream-side connection pipe 131*a*, the second two-way flow controller 125 and the third downstream-side connection pipe 131*b*. The solution of the distributer 163 is in turn distributed from this distributer 163 through the syphon gap defined by the depression of the corrugated surface of the second syphon 138 and flows down along the inner surface of the first absorber 105, which is provided with the screw type heat transfer fin 116, and absorbs the refrigerant gas generated by evaporation of the condensed refrigerant contacting with the outer surface of the cool water pipe 107, thus to become a dilute solution.

In this cooling operation, part of the refrigerant, continuing to be in the condensed state even after it is distributed by the refrigerant distributer 160 and makes contact with the outer surface of the cool water pipe 107, is separated from the dilute solution by the separating member 148. The separated condensed refrigerant is in turn pumped by the refrigerant pump 145 in order to be recovered by the refrigerant tank 144 through the recovery pipe 146, the third three-way flow controller 149 and the tributary pipe 143. The refrigerant recovered by the refrigerant tank 144 is recirculated through the refrigerant circulation system together with the condensed refrigerant supplied from the first to fourth condensers 104*a* to 104*d*, thus to improve the cooling effect of the heating and cooling device.

The cool water flowing in the cool water pipe 107 and cooled by the condensed refrigerant is supplied to the room heat exchanger (not shown) through the cool water supply pipe 175 in order to cool the room.

In the above cooling operation of the heating and cooling device, the second three-way flow controller 140 is closed at the side of the third connection pipe 131*b* while the downstream-side solution pipe 112*b* is opened.

The dilute solution collected on the bottom of the first absorber 105 returns to the generator 101 through the second connection pipe 113 and the solution heat exchanger 106, thus to finish one cycle of the cooling operation. While passing through the solution heat exchanger 106, the dilute solution exchanges the heat with the high temperature and high pressure concentrated solution. The condensation heat generated by the condensation of the refrigerant in the first to fourth condensers 104a to 104d is removed by the air circulating between the plurality of aircooled fins 119a provided between the first to fourth condensers 104a to 104d. The air circulating between the aircooled fins 119a also cools the concentrated solution, flowing in the second absorber 162 and supplied to the inner surface of the first absorber 105, thus to improve the absorption effect of the solution for the evaporated refrigerant.

Meanwhile, in the heating operation of the device of this third embodiment, the fan 8 is not rotated and the cooling water spray 25 sprays no water. In this heating operation, the first two-way flow controller 122 is closed while the first three-way flow controller 128 is closed at the side of the first connection pipe 103a. Thus, the high temperature and high pressure refrigerant gas generated by the generator 101 is directly introduced into the refrigerant distributer 160 in the upper section of the first absorber 105 through the upstream-side gas pipe 102a, the tributary pipe 126, the first three-way flow controller 128 and the first downstream-side connection pipe 103b in order.

In the first absorber 105, the high temperature and high pressure refrigerant gas is distributed by the distributer 160 and evenly drops onto the outer surface of the coiled cool water pipe 107, spirally extending between the upper section of the first absorber 105 and the bottom of the absorber 105, and heats the cool water flowing in the cool water pipe 107. The heated water in the cool water pipe 107 is supplied to the room heat exchanger through the cool water supply pipe 175 in order to heat the room.

As a result of the heat exchange with the cool water in the pipe 107, the refrigerant is condensed and this condensed refrigerant returns to the generator 101 along with the solution through the refrigerant and solution separating member 148 in the lower section of the first absorber 105, the recovery pipe 146, the third three-way flow controller 149 and the second connection pipe 113 and the solution heat exchanger 106, thus to finish one cycle of the heating operation. While passing through the solution heat exchanger 106, the condensed solution exchanges the heat with the high temperature and high pressure concentrated solution.

Figure 8:
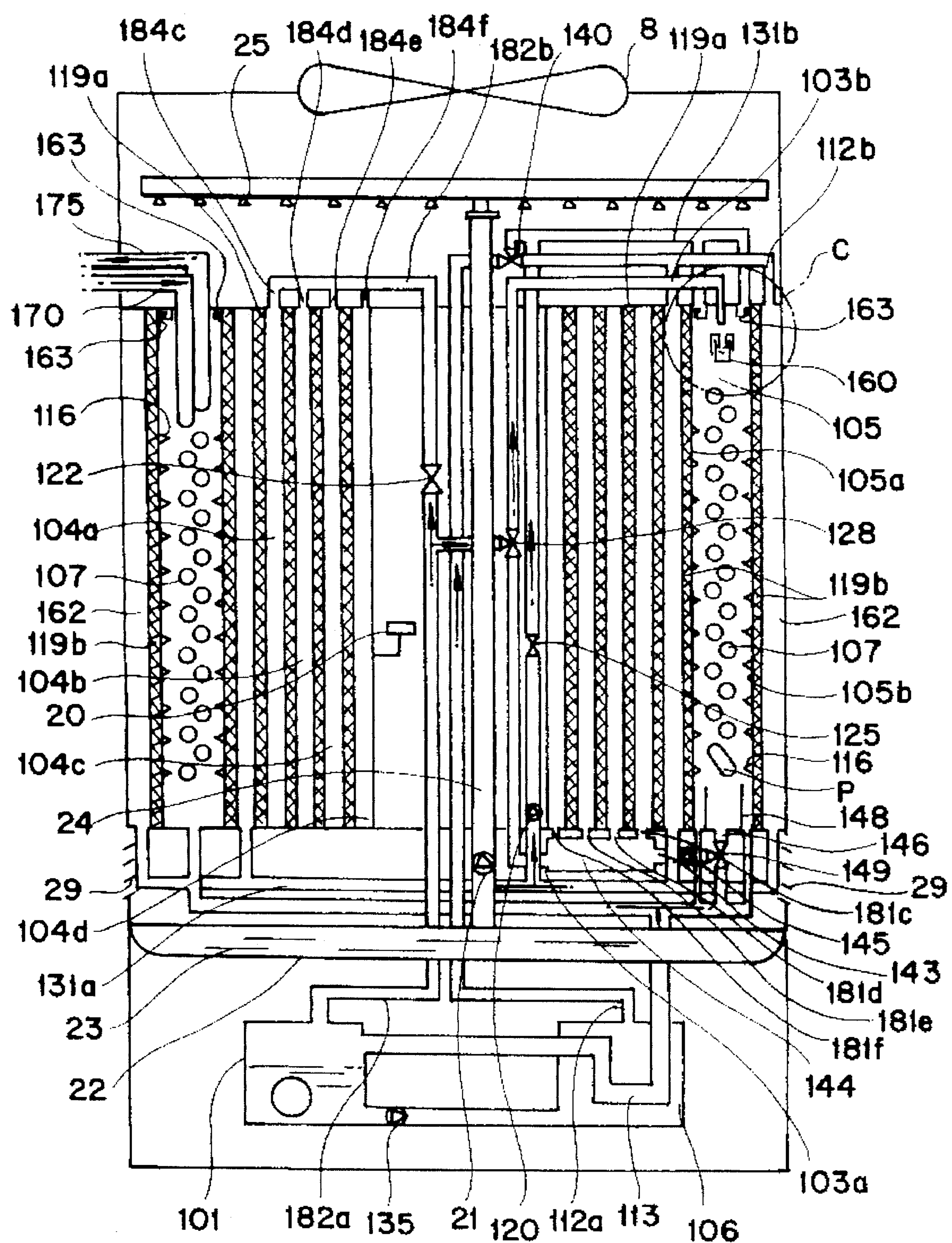
FIG. 8 is a schematic sectional view of an absorption heating and cooling device in accordance with a fourth alternate embodiment of the present invention.

Referring to FIG. 8, there is shown an absorption heating and cooling device in accordance with a fourth alternate embodiment of the present invention. In the following description for the fourth alternate embodiment, the same elements as those of the third alternate embodiment of FIG. 6 will carry the same reference numerals and further explanation for those elements is not given.

The device of this fourth embodiment is different from the third alternate embodiment shown in FIG. 6 as follows. That is, differently from the third embodiment, the high temperature and high pressure refrigerant gas of the generator 101 in the cooling operation of this device is introduced into the upper sections of the first to fourth condensers 104a to 104d through an upstream-side gas pipe 182a, the first two-way flow controller 122, a downstream-side gas pipe 182b and first to fourth branch pipes 184c to 184f in order. The refrigerant gas introduced into the first to fourth condensers 104a to 104d is condensed on the inner surfaces of the condensers 104a to 104d while generating condensation heat. This condensation heat is radiated to the outside by the plurality of aircooled fins 119a which are provided between the first to fourth condensers 104a to 104d, respectively. The other process of the cooling operation of this device remains the same as in the third embodiment shown in FIG. 6 and further explanation is thus not deemed necessary.

As described above, in an absorption heating and cooling device in accordance with the third or fourth alternate embodiment of the present invention, the high temperature and high pressure refrigerant gas generated by the generator in a cooling operation is introduced into the upper sections of the plurality of condensers through the plurality of branch pipes. In addition, the condensation heat generated in the condensers is radiated to the outside by the plurality of aircooled fins which are provided between the condensers. In this device, the diameters of the branch pipes are different from each other and gradually smaller from the outside pipe to the inside pipe such that the innermost condenser is supplied with the refrigerant gas through the innermost branch pipe having the smallest diameter while the outermost condenser is supplied with the refrigerant gas through the outermost branch pipe having the largest diameter. The inner surface of the first absorber is provided with the screw type heat transfer fin for improving the absorption effect for the refrigerant gas evaporated during the heating or cooling operation of the device. In this device, the condensation heat generated by the condensation of the refrigerant gas in the condensers is removed by the air circulating about the plurality of aircooled fins provided between the condensers and about the plurality of aircooled fins provided between the condensers and the first absorber and provided between the first and second absorbers. Hence, this device improves the condensation efficiency as well as the heat exchanging efficiency.

The absorption heating and cooling device in accordance with the third or fourth alternate embodiment also includes the refrigerant distributer and the solution distributer which are provided in the upper section of the first absorber and provided with individual syphons having corrugated surfaces. Thanking for the syphons of the distributers, there is provided a syphon gap between a depression of the corrugated surface of each of the syphons and the side wall of a corresponding distributer and this syphon gap causes a desired even distribution of the refrigerant or of the concentrated solution even when the distributer is not precisely horizontally arranged in the device. In this regard, the heat exchanging effect of the device is remarkably improved and, furthermore, the installation of the distributers is easily achieved.

In the absorption heating and cooling device in accordance with the third or fourth alternate embodiment, the refrigerant and solution separating member is arranged at the lower section of the first absorber. Hence, the refrigerant remaining the condensed state even after it contacts with the outer surface of the cool water pipe is separated from the dilute solution by the separating member and in turn recovered by the refrigerant tank in order to recirculate through the cooling cycle of the device together with the condensed refrigerant supplied from the condensers. In this regard, this device reliably prevents the refrigerant remaining the condensed state from introduction into the solution heat exchanger, thus to reduce the calory consumption of the generator and to improve the cooling effect of the device.

Figure 9:
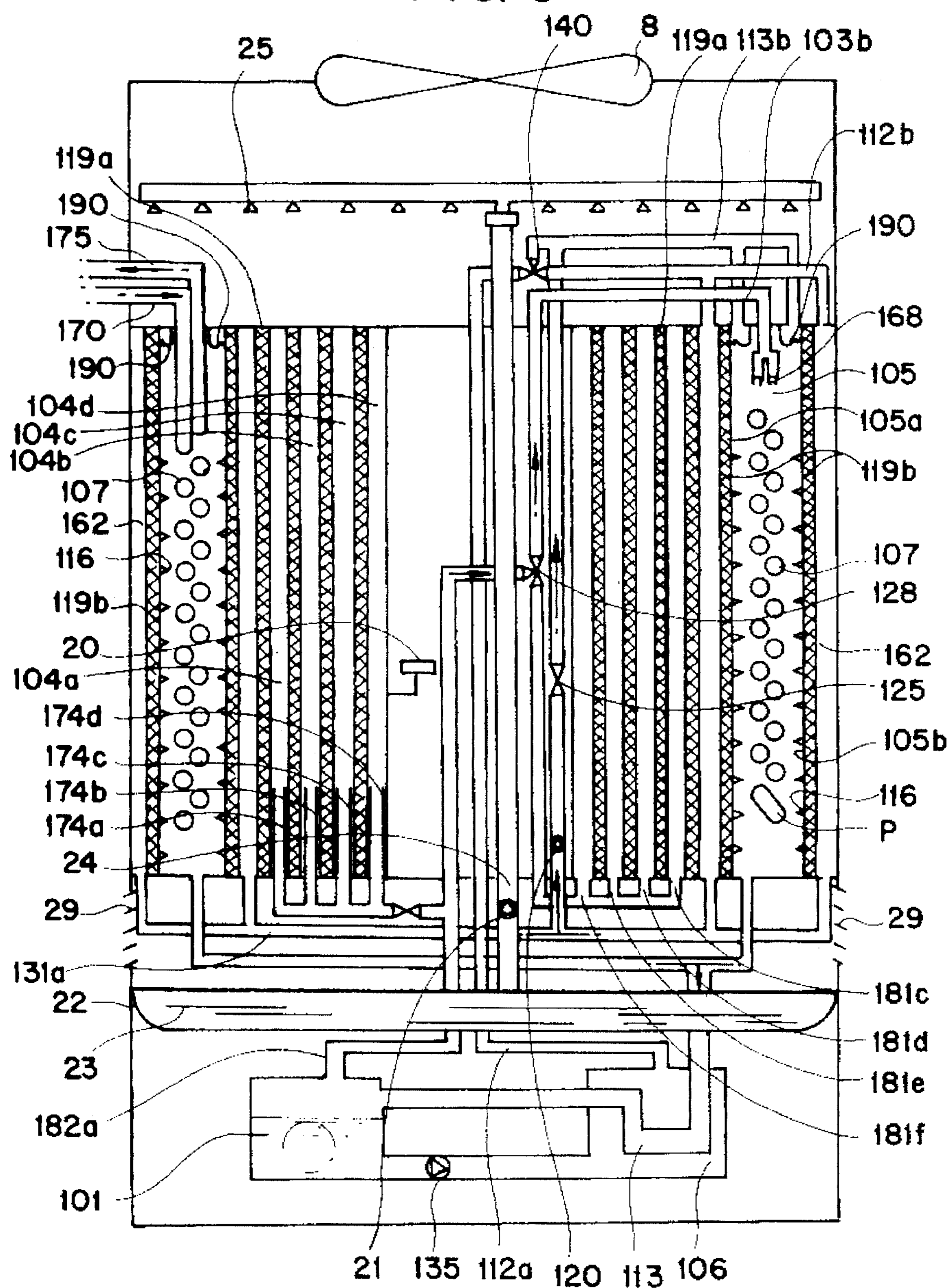
FIG. 9 is a schematic sectional view of an absorption heating and cooling device in accordance with a fifth alternate embodiment of the present invention.

Turning to FIG. 9, there is shown an absorption heating and cooling device in accordance with a fifth alternate embodiment of the present invention. In the following description for the fifth alternate embodiment, the same elements as those of the third alternate embodiment of FIG. 6 will carry the same reference numerals and further explanation for those elements is not given.

The device of this fifth embodiment is different from the third alternate embodiment shown in FIG. 6 as follows. That is, differently from the third embodiment, the terminal end of the first downstream-side connection pipe **103*b* connected to the upper section of the first absorber 105 is provided with a refrigerant distributer 168 which has a plurality of branched refrigerant discharge ports for evenly distributing the refrigerant onto the outer surface of the cool water pipe 107. In addition, the terminal ends of the third downstream-side connection pipe 131*b* connected to the upper section of the first absorber 105 is provided with a solution distributer 190 which distributes the concentrated solution in order to cause this solution to flow down along the inner surface of the first absorber 105**.

In the heating and cooling device of this fifth embodiment, the condensed refrigerant is distributed by the distributer 168 and evenly drops onto the outer surface of the coiled cool water pipe 107, spirally extending between the upper section of the first absorber 105 and the bottom of the absorber 105, and cools the cool water flowing in the cool water pipe 107. The cooled water in the cool water pipe 107 is supplied to the room heat exchanger through the cool water supply pipe 175 in order to cool the room.

At this time, the concentrated solution is distributed from the solution distributer 190 of the terminal ends of the third downstream-side connection pipe **131*b* and flows down along the inner surface of the first absorber 105, and absorbs the refrigerant evaporated from the outer surface of the cool water pipe 107**. The other process of the cooling operation of the device of this fifth embodiment remains the same as in the third embodiment and further explanation is thus not deemed necessary.

Figure 10:
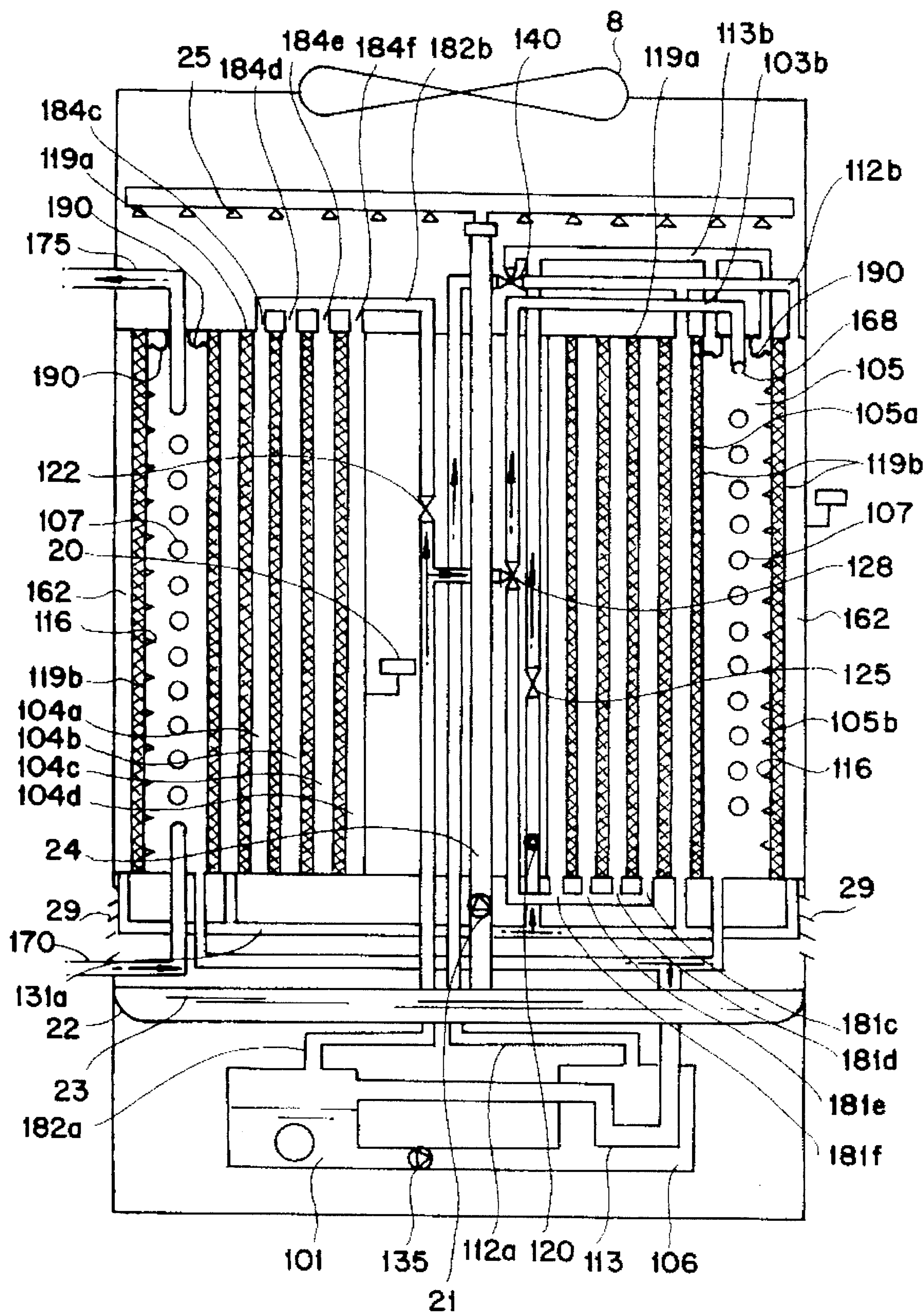
FIG. 10 is a schematic sectional view of an absorption heating and cooling device in accordance with a sixth alternate embodiment of the present invention.

FIG. 10 is a schematic sectional view of an absorption heating and cooling device in accordance with a sixth alternate embodiment of the present invention. Differently from the fifth embodiment, in the device according to the sixth embodiment, the cool water introducing pipe 170 is placed under the air intake port 29 and the coiled cool water pipe 107, spirally extending between the upper section of the first absorber 105 and the bottom of the absorber 105, is connected at an end thereof to the cool water introducing pipe 170 and at the other end thereof to the cool water supply pipe 175.

The other construction of the device of this sixth embodiment remains the same as in the fifth embodiment and further explanation is thus not deemed necessary.

Figure 11:
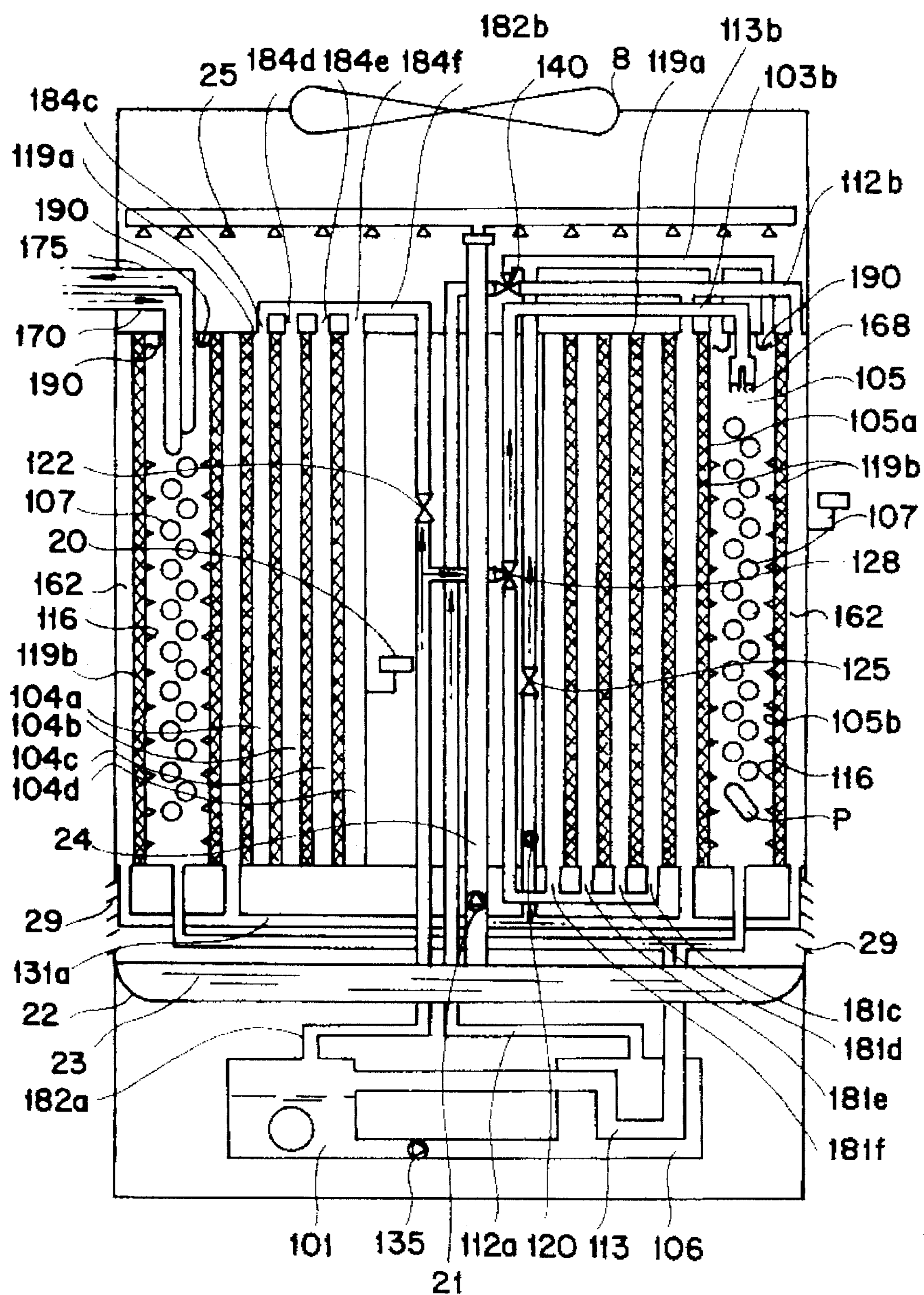
FIG. 11 is a schematic sectional view of an absorption heating and cooling device in accordance with a seventh alternate embodiment of the present invention.
Figure 12:
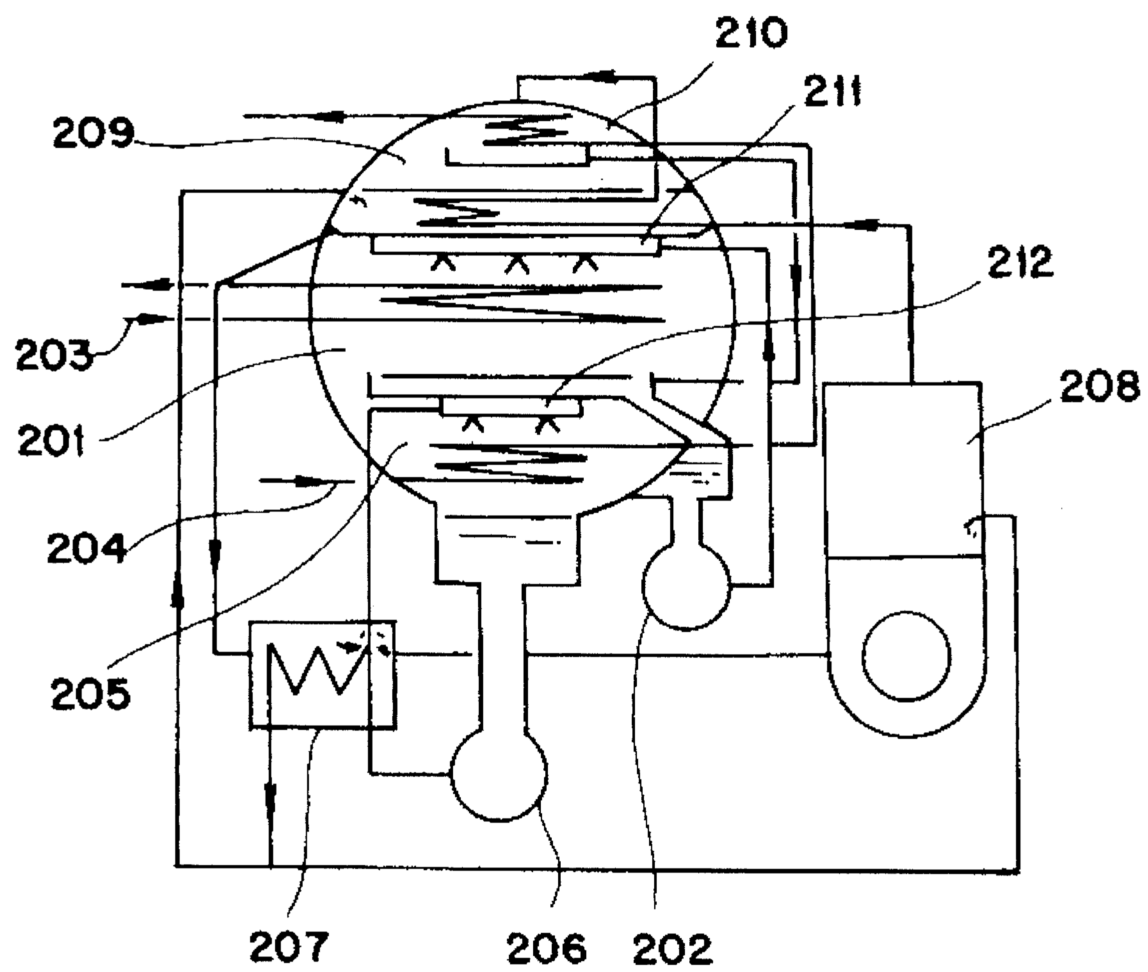
FIG. 12 is a schematic sectional view of an absorption heating and cooling device in accordance with the prior art.

Turning to FIG. 11, there is shown an absorption heating and cooling device in accordance with a seventh alternate embodiment of the present invention. In the seventh embodiment, the general shape of the device remains the same as in the fourth embodiment, but the refrigerant distributer and the solution distributer are altered as follows. That is, in the same manner as in the fifth embodiment, the terminal end of the first downstream-side connection pipe **103*b* connected to the upper section of the first absorber 105 is provided with the refrigerant distributer 168 which has the plurality of branched refrigerant discharge ports for evenly distributing the refrigerant onto the outer surface of the cool water pipe 107. In addition, the terminal ends of the third downstream-side connection pipe 131*b* connected to the upper section of the first absorber 105 is provided with the solution distributer 190 which distributes the concentrated solution in order to cause this solution to flow down along the inner surface of the first absorber 105**.

In an absorption heating and cooling device in accordance with one of the fifth to seventh alternate embodiment of the present invention, the refrigerant condensation efficiency is improved by the plurality of condensers. The second absorber cools the concentrated solution and this improves the refrigerant absorption efficiency of the device. Furthermore, the coiled cool water pipe provided in the first absorber enlarges the heat transfer area, thus to improve the heat exchanging efficiency of the device.

In addition, the condensed refrigerant is evenly distributed from the refrigerant distributer in order to evenly drop onto the outer surface of the coiled cool water pipe in the first absorber, thus to improve the heat exchanging rate. The concentrated solution is evenly distributed from the solution distributer in order to evenly flow down along the inner surface of the first absorber, thus to double the improvement of the refrigerant absorption efficiency of the device.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An absorption cooling apparatus comprising:

generating means for receiving a dilute solution and separating said dilute solution into a high temperature, high pressure refrigerant gas and a refrigerant absorbing liquid;

a plurality of condensers for condensing high temperature, high pressure refrigerant gas into refrigerant condensate;

a plurality of branch pipes for receiving high temperature, high pressure refrigerant gas from said generating means and delivering said high temperature, high pressure refrigerant gas to said condensers;

a precooler arranged to receive refrigerant absorbing liquid from said generating means, and for reducing the temperature of said refrigerant absorbing liquid;

an absorber arranged to receive refrigerant condensate from said condensers, and refrigerant absorbing liquid from said precooler, said absorber including:

a first distributor for distributing refrigerant condensate downwardly through a central portion of said absorber, and a second distributor for distributing refrigerant absorbing liquid downwardly along an outer portion of said absorber to absorb evaporated refrigerant and form therewith a dilute solution;

conduit means extending through said absorber for conducting a heat exchange fluid which is cooled as it passes through said absorber; and heat transfer fins arranged between one of said condensers and said absorber.

2. An absorption cooling apparatus according to claim 1 including heat exchanging means in which refrigerant absorbing liquid traveling from said generating means to said precooler is passed in heat exchanging relationship with dilute solution traveling from said second absorber to said generating means.

3. An absorption cooling apparatus according to claim 1 further including a conduit interconnecting said generating means with said branch pipes, said conduit being connected in parallel to said branch pipes such that a first of said branch pipes is connected to said conduit and a second of said branch pipes is connected to said conduit downstream of said connection between said conduit and said first branch pipe, said second branch pipe having a larger diameter than said first branch pipe.

4. An absorption cooling apparatus according to claim 1, wherein said first distributor includes a syphon for evenly distributing refrigerant condensate onto said conducting means.

5. An absorption cooling apparatus according to claim 4, wherein said first distributor is disposed substantially along a center axis of said absorber, said second distributor being offset from said center axis and including a syphon arranged to direct refrigerant absorbing solution along a side wall of said absorber.

6. An absorption cooling apparatus according to claim 1, wherein said precooler encircles said absorber.

7. An absorption cooling apparatus according to claim 6 including heat transfer fins disposed between said precooler and said absorber.

8. An absorption cooling apparatus comprising:

generating means for receiving a dilute solution and separating said dilute solution into a high temperature, high pressure refrigerant gas and a refrigerant absorbing liquid;

a plurality of condensers for condensing high temperature, high pressure refrigerant gas into refrigerant condensate;

a plurality of branch pipes for receiving high temperature, high pressure refrigerant gas from said generating means and delivering said high temperature, high pressure refrigerant gas to said condensers;

a precooler arranged to receive refrigerant absorbing liquid from said generating means, and for reducing the temperature of said refrigerant absorbing liquid;

an absorber encircled by said precooler and arranged to receive refrigerant condensate from said condensers, and refrigerant absorbing liquid from said precooler, said absorber including:

a first distributor for distributing refrigerant condensate downwardly through a central portion of said absorber, and a second distributor for distributing refrigerant absorbing liquid downwardly along an outer portion of said absorber to absorb evaporated refrigerant and form therewith a dilute solution; and conduit means extending through said absorber for conducting a heat exchange fluid which is cooled as it passes through said absorber.

9. An absorption cooling apparatus comprising:

generating means for receiving a dilute solution and separating said dilute solution into a high temperature, high pressure refrigerant gas and a refrigerant absorbing liquid;

a plurality of condensers for condensing high temperature, high pressure refrigerant gas into refrigerant condensate;

a plurality of branch pipes for receiving high temperature, high pressure refrigerant gas from said generating means and delivering said high temperature, high pressure refrigerant gas to said condensers;

a precooler arranged to receive refrigerant absorbing liquid from said generating means, and for reducing the temperature of said refrigerant absorbing liquid;

an absorber arranged to receive refrigerant condensate from said condensers, and refrigerant absorbing liquid from said precooler, said absorber including:

a first distributor for distributing refrigerant condensate downwardly through a central portion of said absorber, and a second distributor for distributing refrigerant absorbing liquid downwardly along an outer portion of said absorber to absorb evaporated refrigerant and form therewith a dilute solution;

conduit means extending through said absorber for conducting a heat exchange fluid which is cooled as it passes through said absorber; and heat transfer fins disposed between said precooler and said absorber.

* * * * *